United States Patent [19]

Hanson et al.

[11] Patent Number: 5,103,783

[45] Date of Patent: Apr. 14, 1992

[54] DETECTION OF ENGINE FUEL PROBLEMS

[75] Inventors: Jay L. Hanson, Bloomington; Doyle G. Herrig, Elko, both of Minn.

[73] Assignee: Thermo King Corporation, Minneapolis, Minn.

[21] Appl. No.: 728,467

[22] Filed: Jul. 11, 1991

[51] Int. Cl.$^5$ ............................................. F02B 77/00
[52] U.S. Cl. ................................................. 123/198 D
[58] Field of Search .... 123/198 D, 198 DB, 198 DC, 123/419, 436

[56] References Cited

U.S. PATENT DOCUMENTS

| | | | |
|---|---|---|---|
| 4,602,605 | 7/1986 | Adkins | 123/198 D |
| 4,663,725 | 5/1987 | Truckenbrod et al. | 364/505 |
| 4,918,932 | 4/1990 | Gustafson et al. | 62/89 |
| 4,960,088 | 10/1990 | Havemann et al. | 123/198 D |

Primary Examiner—Noah P. Kamen
Attorney, Agent, or Firm—D. R. Lackey

[57] ABSTRACT

Methods and apparatus for detecting fuel problems of an internal combustion engine, including low fuel, a plugged fuel filter, a pinched fuel line, air in the fuel system, and gelled fuel. The detection of a fuel system problem is followed by engine shutdown, with shutdown being initiated quickly enough to retain sufficient fuel in the fuel system to re-start the engine without the necessity of priming. The invention includes the detection and counting of predetermined engine speed fluctuations. A timer is started upon the detection of the first predetermined speed fluctuation. If a predetermined count is reached before the timer reaches a predetermined time value, the engine is shutdown when the count is reached. If the timer reaches the time value before the count value is reached, the counter and timer are reset to await another predetermined engine speed fluctuation.

6 Claims, 6 Drawing Sheets

DETECTION OF ENGINE FUEL PROBLEMS

TECHNICAL FIELD

The invention relates in general to internal combustion engines, such as Diesel engines, and more specifically to methods and apparatus for detecting fuel problems in internal combustion engines.

BACKGROUND ART

U.S. Pat. No. 4,960,088, which is assigned to the same assignee as the present application, discloses a low fuel shut-off system for a Diesel engine which utilizes an auxiliary fuel tank. A level sensor in the auxiliary fuel tank provides a signal when the fuel level drops below a predetermined point, with the signal being used by associated electrical control to shut down the engine while a supply of fuel still remains in the fuel supply circuit which is sufficient to start the engine without priming.

While the low fuel shut-off system of the aforesaid patent functions well, it requires extra mechanical components and piping, as well as modifications to the associated electrical control. It would be desirable, and it is an object of the present invention, to be able to detect fuel problems, regardless of source, e.g., low fuel, plugged filter, pinched fuel line, air in the fuel system, gelled fuel, and the like, all without requiring any additional mechanical components, without requiring piping changes in the fuel system, and without requiring changes to the hard wired electrical control.

SUMMARY OF THE INVENTION

Briefly, the present invention includes methods and apparatus for detecting fuel problems, including low fuel, of an internal combustion engine, such as in an engine connected to drive a refrigerant compressor in a transport refrigeration unit. In a preferred embodiment, a computer, such as a microprocessor, is utilized, with the microprocessor having an input from an engine speed sensor, such as an RPM sensor associated with the engine flywheel. The engine speed sensor is normally present in a microprocessor controlled transport refrigeration unit, as it provides engine speed feedback to the microprocessor. The engine speed information is used by the microprocessor while starting the engine to determine if the engine is starting properly.

The present invention includes new methods and apparatus for detecting fuel problems in an internal combustion engine, including the detection of low fuel before air enters a fuel injection system, with the new method utilizing the output of the engine speed sensor after the engine has started. The new method includes the steps of monitoring the speed of the engine, detecting predetermined fluctuations in engine speed, counting said predetermined fluctuations, timing a predetermined time interval after the detection of a predetermined relationship, resetting the count and the time when the count does not reach a predetermined value within the predetermined time interval, and shutting the engine down when the count reaches the predetermined value before the expiration of the predetermined time interval.

In a preferred embodiment of the invention, the step of monitoring the speed of the engine is repeated rapidly at regularly spaced intervals, such as once a second. A predetermined fluctuation in engine speed is determined by the steps of noting during each monitoring interval whether the engine speed is above or below predetermined speeds, storing each notation for use during the next monitoring interval, comparing the current notation with the stored notation of the prior monitoring interval, and counting as a predetermined fluctuation only those comparisons which find that the stored notation indicates the engine speed was above a predetermined speed and the current notation indicates the engine speed is below a predetermined speed.

The predetermined relationship which starts the timing of a predetermined time interval is preferably the step of detecting a predetermined fluctuation, which increments the count to 1, and then the step of detecting a comparison which is not counted as a predetermined fluctuation.

The new apparatus for detecting fuel problems of an internal combustion engine includes monitoring means for monitoring the speed of the engine, detector means responsive to said monitoring means for detecting predetermined fluctuations in engine speed, counter means responsive to said detector means for counting said predetermined fluctuations, timer means for timing a predetermined time interval after the detection of a predetermined relationship, with said predetermined relationship including the detection of predetermined fluctuation in engine speed by said detector means, reset means for resetting the counter means and the timer means when the count fails to reach a predetermined value within the predetermined time interval, and engine shutdown means for shutting the engine down when the count reaches the predetermined value before the expiration of the predetermined time interval.

In a preferred embodiment, the monitoring means repeatedly monitors the engine speed during closely spaced regular intervals, such as once a second. The speed fluctuation detector means includes means for noting during each monitoring interval whether the engine speed is above or below predetermined speeds, storing means for storing each notation for use during the next monitoring interval, and comparison means for comparing the current notation with the stored notation of the prior monitoring interval. The counter means counts as a predetermined fluctuation only those comparisons by the comparison means which find that the stored notation indicates the engine speed was above a predetermined speed and the current notation indicates the engine speed is below a predetermined speed.

The predetermined relationship which starts the timing of a predetermined time interval preferably includes, in addition to the detection of a predetermined fluctuation by the detector means, a subsequent comparison by the comparison means which is not counted as a predetermined fluctuation.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
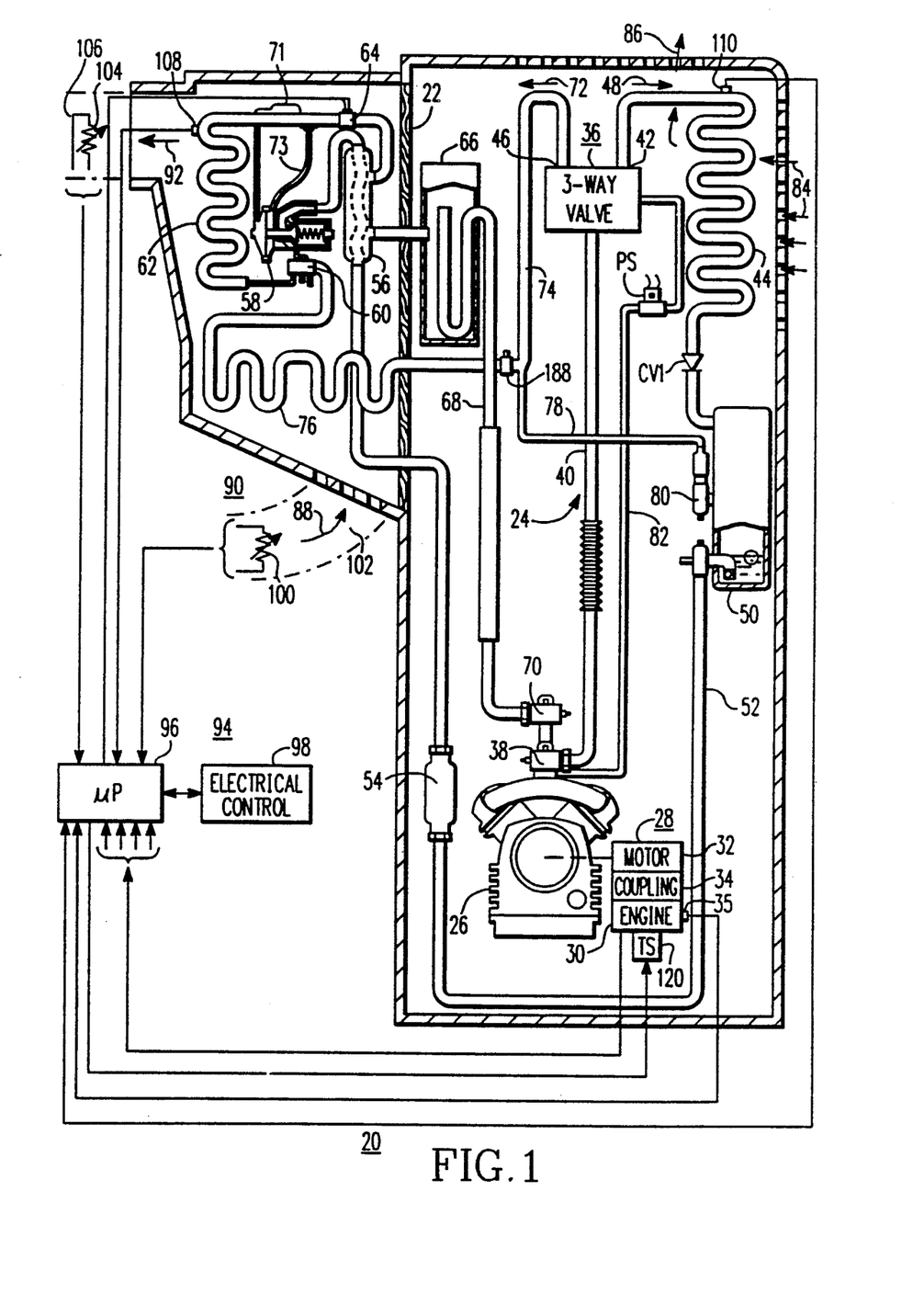
FIG. 1 is a partially block and partially schematic diagram of a refrigeration system which may utilize the methods of the invention.

Referring now to the drawing, and to FIG. 1 in particular, there is shown a transport refrigeration unit 20 which ma utilize the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects one of the two prime movers and provides an output signal to identify the selection.

Discharge ports of compressor 26 are connected to an inlet port of a three way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air", is returned to the space 90. During an evaporator defrost cycle, the evaporator fan or blower is not operated, and a defrost air damper may be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor (HPCO) 110 disposed on the high side of the refrigerant circuit 48, and from various engine sensors shown in FIG. 2B, such as oil level sensor 112, oil pressure sensor 114, engine coolant temperature sensor 116, and engine speed sensor 118. A timer 119 may accumulate operational time of unit 20 and provide a signal RUNT to microprocessor 96 for maintenance purposes. Instead of a hardware timer, microprocessor 96 may also tabulate run time in a software timer.

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
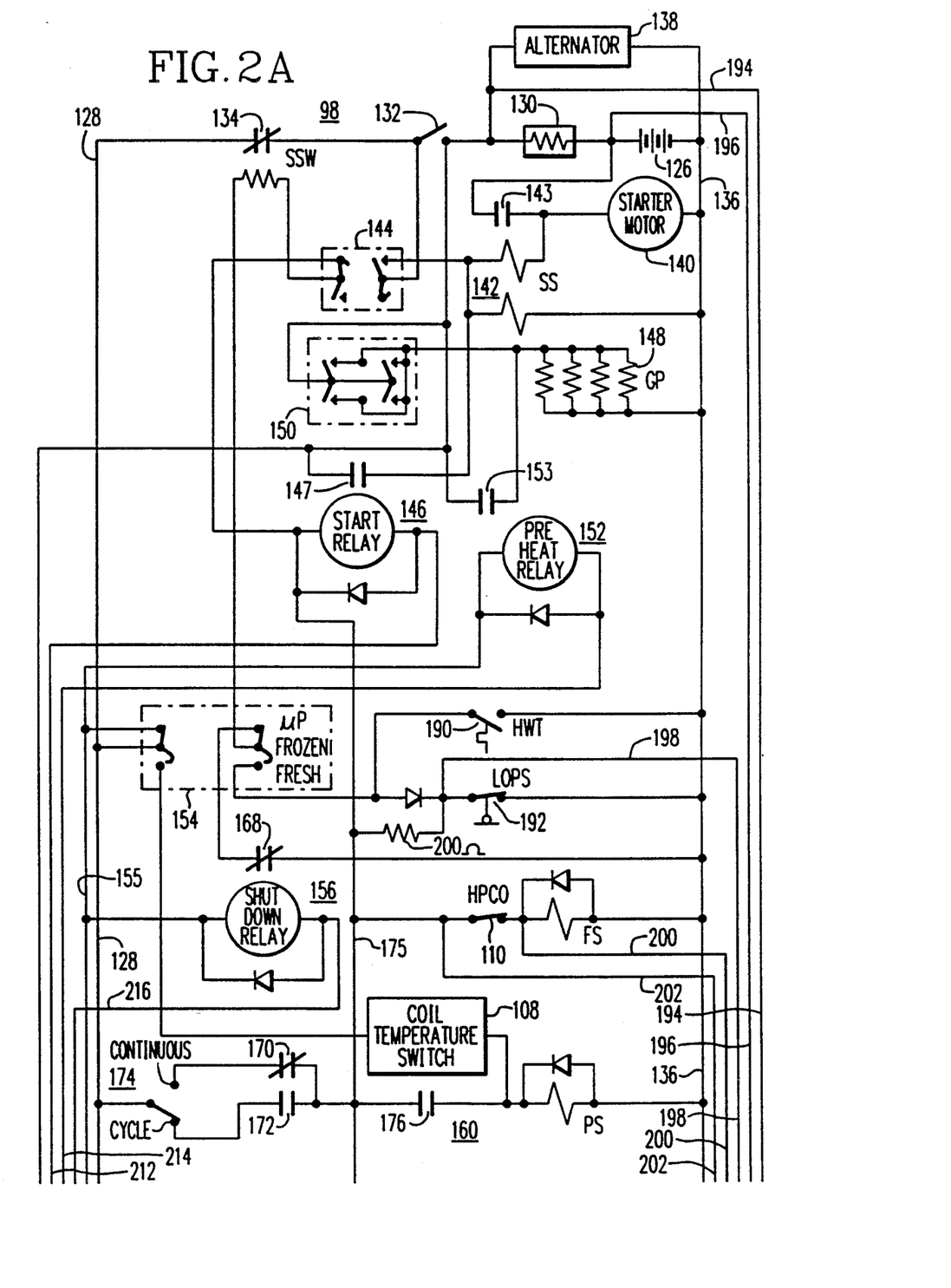
FIGS. 2A and 2B may be assembled to provide an electrical schematic diagram of microprocessor based electrical control shown in block form in FIG. 1.
Figure 2B:
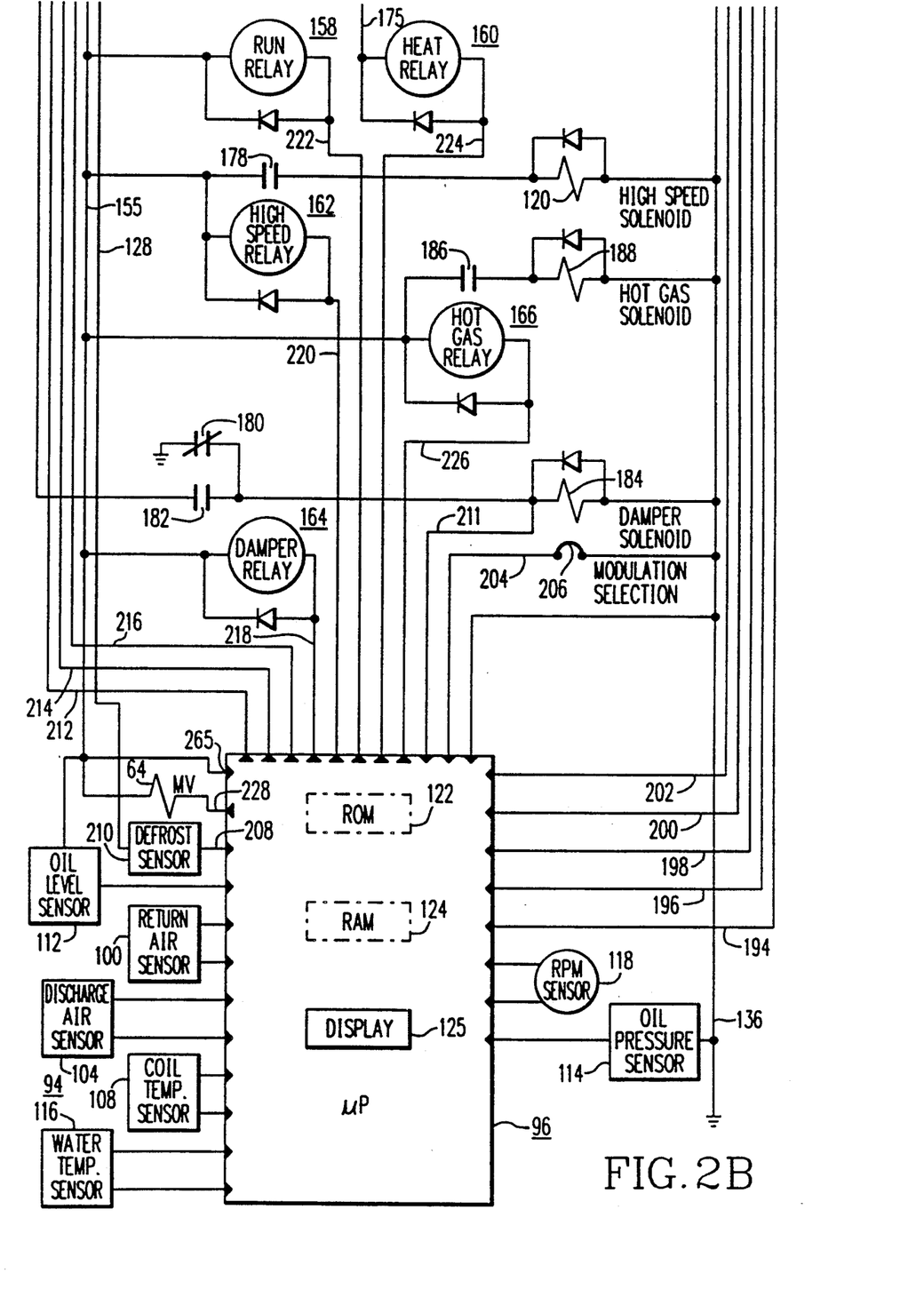

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs. Microprocessor 96 also includes a display 125 for displaying fault codes, flashing alarms, steady alarms, system status indicating lights, and the like, with reference 127 being an alarm indicator light which can be flashed on and off for a flashing alarm signal, as well as illuminated steadily for a steady alarm signal. Display 125 also has a plurality of buttons 129 for providing input signals to the microprocessor from the operator, including coded signals which enable only personnel having access to the codes to cause microprocessor 96 to perform certain tasks. Display 125 additionally includes a display portion 131 which generates illuminated numbers and/or letters in predetermined coded combinations to identify the cause of certain faults when then occur.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of the microprocessor 96. The upper position provides voltage from conductor 128 to a conductor 155. An intermediate position of switch 154, in which the center terminal is not connected to either the upper terminal or the lower terminal, is selected when the microprocessor 96 is not utilized and the load in the conditioned space 90 is frozen. This switch position will cause unit 20 to operate continuously in a low speed cool mode. The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35 degrees F, to energize the pilot solenoid PS and initiate a heating cycle, and to open at a predetermined higher temperature, such as 38 degrees F, to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode, also called "cycle sentry", which includes starting and stopping the prim mover 28.

The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Hot gas relay 166 is provided for controlling the hot gas solenoid valve 77 via a set of normally open contacts 186, when a hot gas solenoid 77 is provided in hot gas line 74.

Control 98 also includes a engine coolant temperature switch (high water temperature—HWT) 190, which closes when the engine coolant reaches a predetermined elevated temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

As the microprocessor functions are described, only those necessary to understanding the invention will be described in detail. Certain of the functions shown in block form, may be described in detail and claimed in concurrently filed application Ser. Nos. 07/728,464; 07/728,665; 07/728,463; and 07/728,471, with application Ser. No. 07/728,665 being hereby incorporated into the specification of the present application by reference.

Figure 3:
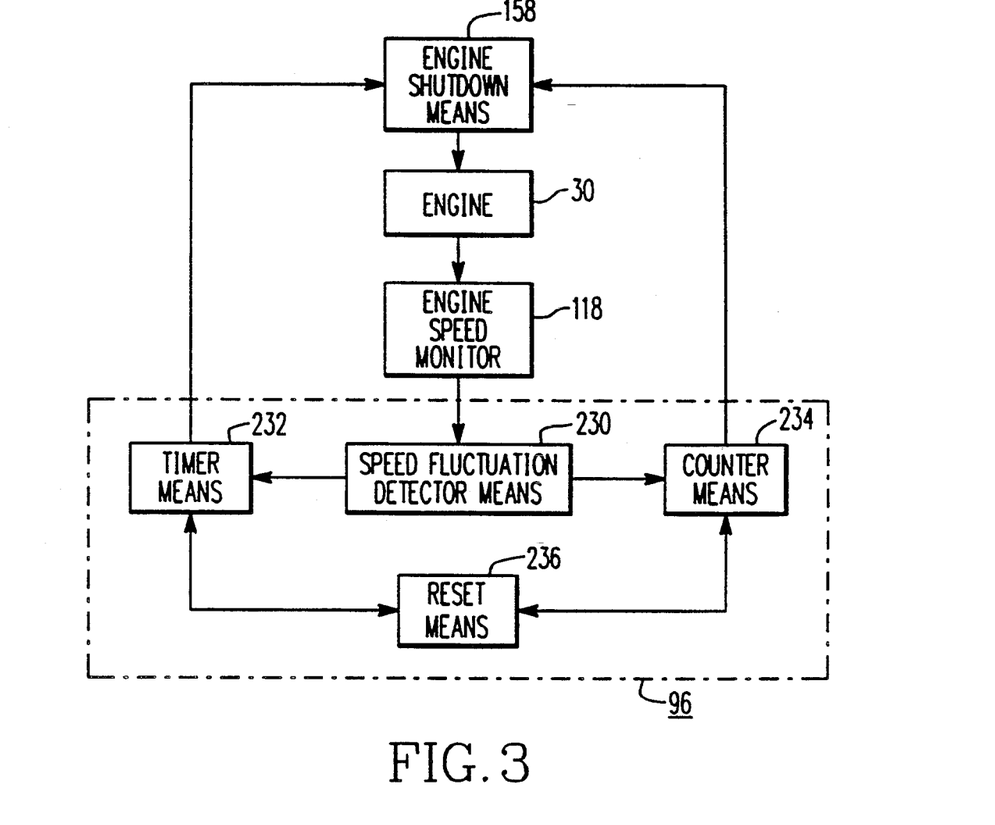
FIG. 3 is a block diagram which diagrammatically illustrates the teachings of the invention.

FIG. 3 is a block diagram which sets forth the invention in conceptual form, using the blocks to illustrate apparatus required to implement the invention. In addition to engine 30, the invention requires the hereinbefore described RPM sensor or speed monitor 118, required by microprocessor 96 during the starting of engine 30; means for shutting engine 30 down, such as by de-energizing run relay 158, which in turn de-energizes the fuel solenoid FS; speed fluctuation detector means 230; a timer 232; a counter 234; and means 236 for resetting the timer 232 and counter 234. When engine 30 starts to have a problem in its fuel system, including low fuel, a plugged fuel filter, a pinched fuel line, air in the fuel system, gelled fuel, and the like, the engine speed will start to fluctuate, and if the engine can be shut down quickly enough, sufficient fuel will remain in the fuel supply circuit for restarting engine 30 without priming, after the problem is fixed. The speed fluctuation detector means 230 detects predetermined fluctuations of the engine speed, and counter 234 counts the predetermined fluctuations. A predetermined relationship, which includes the counting of at least one predetermined fluctuation, starts the timer 232. If the count on counter 234 reaches a predetermined value before the timer 232 times a predetermined period of time, it indicates that the fluctuations are not momentary or transient, and that a real problem exists in the fuel supply of engine 30. The engine shutdown means 158 is responsive to the counter 234 reaching the predetermined count before the expiration of the predetermined period of time, and engine 30 is quickly shut down.

Figure 4:
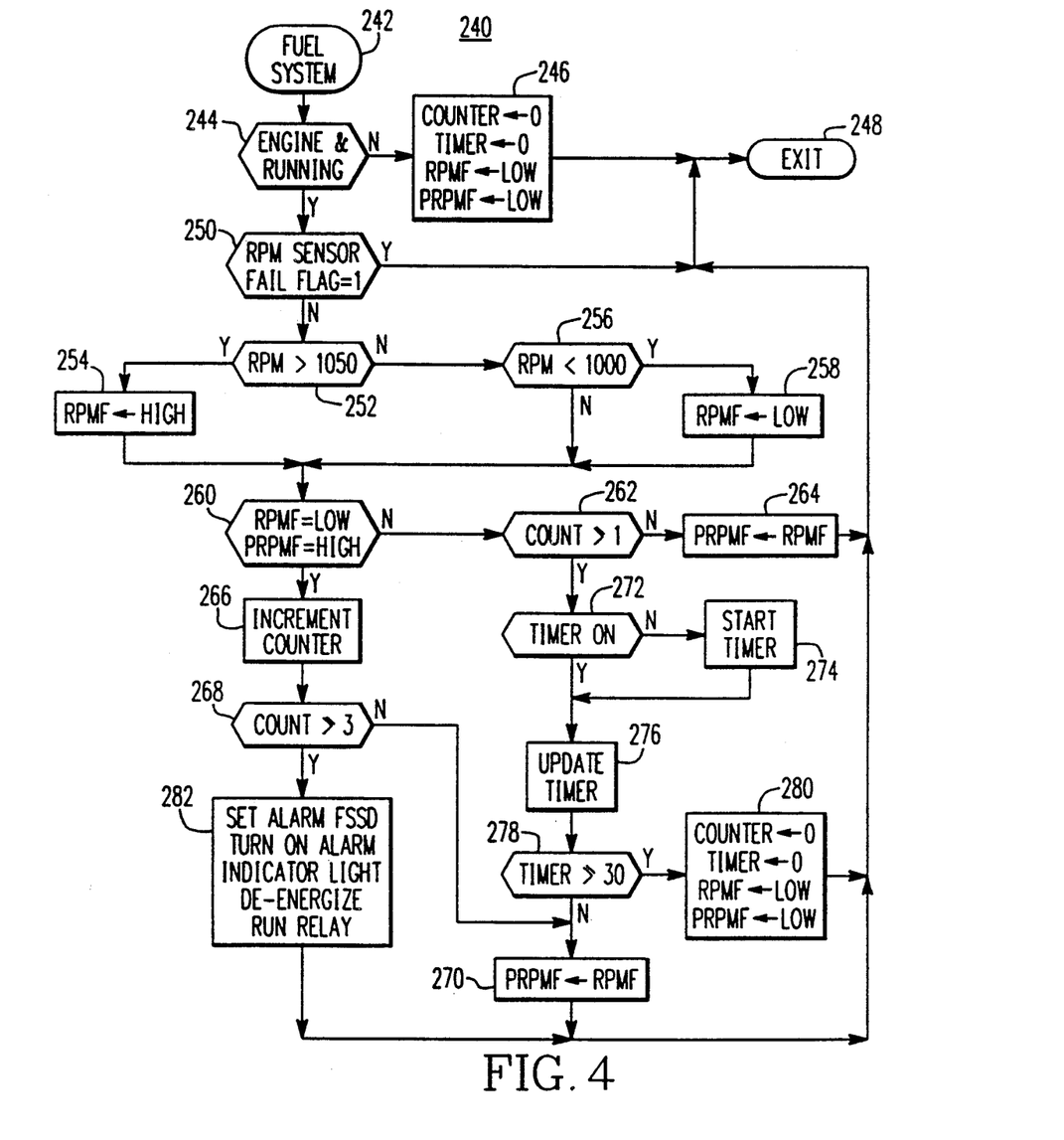
FIG. 4 is a flow diagram of a program for checking the fuel system of an internal combustion engine, which sets forth the methods of the invention.

As set forth within the broken outline in FIG. 3, the functions performed by blocks 230, 232, 234, and 236 are preferably performed by a computer, such as the microprocessor 96 shown in FIG. 2B, with this preferred embodiment of the invention being described in detail relative to a flow diagram of a program 240 shown in FIG. 4.

More specifically, the fuel system checking program 240 shown in FIG. 4 is run periodically by microprocessor 96, such as once a second. Program 240 is entered at 242 and step 244 determines if engine 30 has been selected as the prime mover, and if so, it determines if the engine is running. If engine 30 is not the selected prime mover, or if engine 30 is the selected prime mover and it is not running, step 246 performs a reset function of a software counter, which performs the function of counter means 234, a software timer, which performs the function of timer 232, and two software flags RPMF and PRPMF. The timer and counter are reset to 0, and the flags are set to indicate "low" speed, e.g., to logic 0. Flag RPMF is used to note and store an engine speed condition during the present running of program 240, while flag PRPMF is used to note and store what the engine speed condition was during the immediately prior running of program 240. The reset function 246 then advances to the program exit at 248.

When step 244 finds engine 30 has been selected as the operative prime mover for driving compressor 26, and it finds engine 30 running, for example by checking run relay 158, step 244 goes to step 250 which checks the condition of an RPM sensor fail flag. The RPM sensor fail flag is controlled by a program used to start engine 30, which is set forth in detail in the hereinbefore mentioned incorporated application Ser. No. 07/728,665. When RPM sensor 118 fails to provide an input during a successful engine start up, the RPM sensor fail flag is set true. If the RPM sensor fail flag is true, program 240 exits at 248.

When step 250 finds RPM sensor 118 is working properly, step 252 determines if the engine RPM exceeds a first predetermined value, e.g., 1050 RPM. If the engine RPM exceeds the first predetermined value, step 254 sets flag RPMF to indicate "high" speed, e.g., by setting flag RPMF to a logic one. If step 252 finds the engine speed is equal to or less than the predetermined value, step 256 checks the engine speed to determine if it is less than a second predetermined value which is slightly lower than the first predetermined value, e.g., 1000 RPM. If the engine RPM is less than the second predetermined value, step 258 sets flag RPMF to indicate "low" speed, e.g., by setting flag RPMF to a logic 0. A finding that the engine RPM is between the first and second values results in no change being made to flag RPMF, i.e., it will remain the same as set on a prior run of program 240.

Steps 254, 258 and the "no" branch from step 256 all proceed to step 260. Step 260, along with the flag setting steps just described, perform the function of the speed fluctuation detector means 230 in FIG. 3, i.e., the detection of a "predetermined fluctuation" in engine speed. Step 260 completes the speed fluctuation function started by the flag setting steps, by determining if flag RPMF is low and flag PRPMF is high. If flag PRPMF is high, and flag RMPF is low, it indicates that on the previous running of program 240 the engine speed was above 1050 RPM and that on the current running of program 240 the engine speed is below 1000, which is the definition of "a predetermined fluctuation" in engine speed, in this exemplary embodiment of the invention.

If this is the first running of program 242 after engine 30 started, flag PRPMF will be low by virtue of the reset step 246, so step 260 follows the "no" branch to step 262 which determines if the software counter which provides the function of counter means 234 has a count value of 1 or greater. On the first running of program 240, the count will be 0, and step 262 goes to step 264 which sets flag PRPMF to the value of flag RPMF, and program 240 exits at 248.

As long as the fuel system of engine 30 has no problems, step 260 will find both flags RPMF and PRPMF high each time program 240 is run, and program 240 will follow steps 262 and 264 to exit 248. The first time program 240 finds that the speed of engine 30 has dipped or dropped below the second predetermined value, e.g., 1000 RPM, flag RPMF will be set low in step 258 and flag PRPMF will be high from the previous running of program 240. Step 260 then goes to step 266. Step 266 increments a software counter which will be called counter 234, as it provides the function of counter means 234 in FIG. 3.

Step 266 advances to step 268 which checks the count on counter 234, to determine if the count has reached or exceeded a predetermined count value, e.g., 3. Since this will be the first count on counter 234, step 268 goes to step 270, which is the same as step 264, setting flag PRPMF to the value of flag RPMF, and the program exits at 248.

On the next running of program 240, regardless of what flag RPMF is set to, flag PRPMF will now be low and step 260 takes the "no" branch to step 262 which will now find counter 234 with a count value of 1. Step 262 then goes to step 272 which determines if a software timer has been activated, with the software timer being called timer 232, since it performs the function of timer 232 in FIG. 3. Since timer 232 will not be active at this point, step 272 goes to step 274, which starts timer 232. Thus, timer 232 is started by "a predetermined relationship", which includes step 260 finding no predetermined engine fluctuation, and step 262 finding a count value other than 0 on counter 234.

Step 274 proceeds to step 276, which updates timer 232, and step 278 determines if timer 232 has reached a predetermined time value, e.g., 30 seconds in the exemplary embodiment. At this point, timer 232 will not have reached 30 seconds, and program 240 exits after setting flag PRPMF equal to flag RPMF in step 270.

If the first detected predetermined engine speed fluctuation, as determined by step 260, was a transient condition, flag RPMF will thereafter be high and program 240 will always go from step 260 through steps 262, 272 and 276 until timer 232 reaches 30 seconds. Step 278 then goes to step 280, which is a reset function similar to step 246, clearing and resetting timer 232 and counter 234, and setting flags PRPMF and RPMF to logic 0. Steps 246 and 280 are the reset means 236 shown in block form in FIG. 3.

Figure 5:
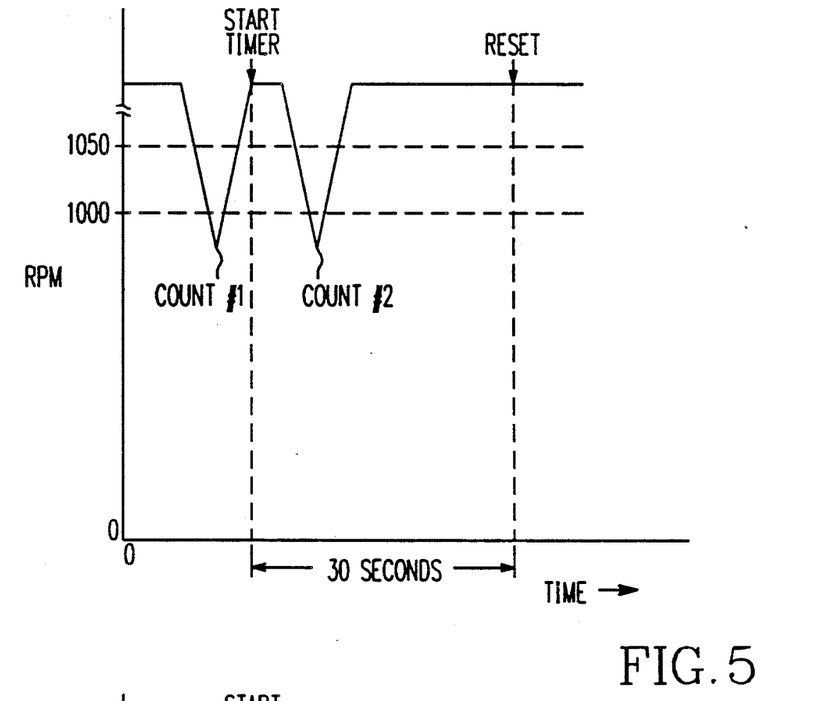
FIG. 5 is a graph which illustrates a reset condition set forth in the flow diagram of FIG. 3.

If step 260 detects a second predetermined fluctuation, but a third fluctuation is not detected within the timing period of timer 232, then step 280 will perform the hereinbefore described reset function. FIG. 5 graphically sets forth two detected fluctuations in engine speed, with engine speed in RPM being on the ordinate, and "time" on the abscissa. The starting of timer 232 is noted in FIG. 5, and the reset function by reset means 236 is also shown, since a third fluctuation in engine speed was not detected before the elapsing of the predetermined period of time.

Figure 6:
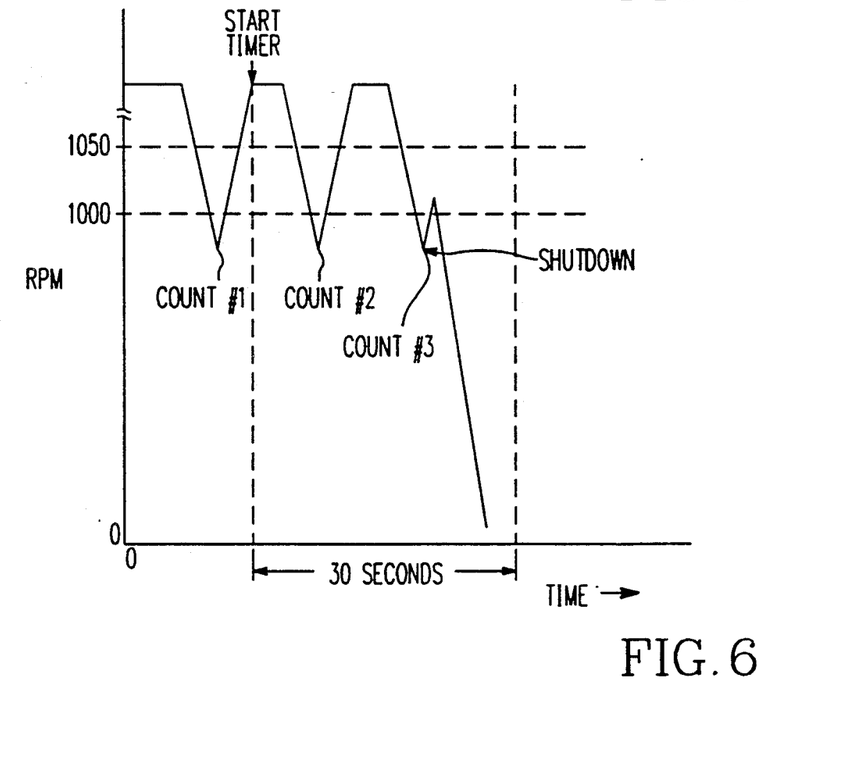
FIG. 6 is a graph which illustrates an engine shutdown condition set forth in the flow diagram of FIG. 3.

If a third fluctuation in engine speed is detected by step 260, step 268 will go to step 282 which sets an alarm FSSD, indicating "fuel system shutdown", with an appropriate identifying code for this alarm being displayed on display 125 shown in FIG. 2B. An alarm indicator light on display 125 is also turned on. Microprocessor 96 also removes the ground path of run relay 158 via conductor 222, de-energizing run relay 158 and de-energizing fuel solenoid FS, shutting engine 30 down. The program then exits at 248. FIG. 6 is a graph similar to that of FIG. 5, except illustrating the detection of a third engine speed fluctuation before the expiration of the predetermined period of time, resulting in the illustrated shutdown of engine 30.

It will be noted that the closer together the engine speed fluctuations, the faster engine 30 will be shutdown, resulting in preserving sufficient fuel to restart engine 30 without priming, even when low fuel is causing the engine speed to fluctuate. If the fluctuations are relatively far apart, resulting in engine 30 being shutdown just before the expiration of the 30 second time period, for example, it means that engine 30 is receiving fuel for most of the time during the 30 second time period, resulting in the fuel system having sufficient fuel for a re-start, without priming, when the fuel system problem is removed. Thus, the 30 second time period has no adverse affect on retaining fuel in the fuel system for a re-start, as the time from the first detection of engine speed fluctuation to engine shutdown is inversely proportional to the severity of the fuel system problem.

We claim:

1. A method of detecting fuel problems of an internal combustion engine having electrical control which includes an engine speed sensor, comprising the steps of:
   monitoring the speed of the engine,
   detecting fluctuations in engine speed,
   counting said fluctuations,
   starting a predetermined time interval after the detection of a predetermined fluctuation,
   resetting the count and the time when the count does not reach a predetermined value within the predetermined time interval, and
   shutting the engine down when the count reaches the predetermined value before the expiration of the predetermined time interval.

2. The method of claim 1 wherein the step of monitoring the speed of the engine is repeated at regular intervals, and wherein a fluctuation in engine speed is determined by the steps of:
   noting during each monitoring interval whether the engine speed is above or below predetermined speeds,
   storing each notation for use during the next monitoring interval,
   comparing the current notation with the stored notation of the prior monitoring interval, and
   counting as a predetermined fluctuation only those comparisons which find that the stored notation indicates the engine speed was above a predetermined speed and the current notation indicates the engine speed is below a speed.

3. The method of claim 2 wherein the predetermined fluctuation which starts the timing of a predetermined time interval is the step of detecting a fluctuation, and then the step of detecting a comparison which is not counted as a fluctuation.

4. Apparatus for detecting fuel problems of an internal combustion engine, comprising:
   monitoring means for monitoring the speed of the engine,
   detector means responsive to said monitoring means for detecting fluctuations in engine speed,
   counter means responsive to said detector means for counting said fluctuations,
   timer means for starting a predetermined time interval after the detection of a predetermined fluctuation,
   reset means for resetting the counter means and the timer means when the count fails to reach a predetermined value within the predetermined time interval, and
   engine shutdown means for shutting the engine down when the count reaches the predetermined value before the expiration of the predetermined time interval.

5. The apparatus of claim 4 wherein the monitoring means monitors the engine speed at regular intervals, and wherein the speed fluctuation detector means includes:
   means for noting during each monitoring interval whether the engine speed is above or below predetermined speeds,
   storing means for storing each notation for use during the next monitoring interval,
   and comparison means for comparing the current notation with the stored notation of the prior monitoring interval,
   with the counter means counting as a fluctuation only those comparisons by the comparison means which find that the stored notation indicates the engine speed was above a predetermined speed and the current notation indicates the engine speed is below a predetermined speed.

6. The apparatus of claim 4 wherein the predetermined fluctuation which starts the timing of a predetermined time interval includes, in addition to the detection of a fluctuation by the detector means, a subsequent comparison by the comparison means which is not counted as a fluctuation.

* * * * *